United States Patent [19]

McMurtry

[11] 4,443,946
[45] Apr. 24, 1984

[54] PROBE FOR MEASURING WORKPIECES

[75] Inventor: David R. McMurtry, Wotton-under-Edge, England

[73] Assignee: Renishaw Electrical Limited, Wotton-under-Edge, England

[21] Appl. No.: 277,637

[22] Filed: Jun. 26, 1981

[30] Foreign Application Priority Data

Jul. 1, 1980 [GB] United Kingdom ............... 8021508

[51] Int. Cl.³ .............................................. G01B 7/28
[52] U.S. Cl. ................................. 33/174 L; 33/169 R; 33/172 E
[58] Field of Search .............. 33/169 R, 174 L, 172 E

[56] References Cited

U.S. PATENT DOCUMENTS 4,155,171  5/1979  McMurtry ..................... 33/174 L
4,270,275  6/1981  McMurtry ..................... 33/174 L

FOREIGN PATENT DOCUMENTS 649942  2/1979  U.S.S.R. ........................ 33/169 R

Primary Examiner—Harry N. Haroian
Attorney, Agent, or Firm—Spencer & Frank

[57] ABSTRACT

A probe having a movable member including an elongate stylus and a plate extending in a plane transverse to the longitudinal axis of the stylus. The plate is seated on a seat having a circular edge provided on the fixed member. Displacement of the free end of the stylus, either transversely to or longitudinally of the stylus, is measured by a transducer having an electrical output signal. Like transverse and longitudinal displacements of the free end unavoidably produce unlike signals. To compensate for this, the signal is passed through a voltage divider whose output is made variable by a relay in a circuit containing the plate and the edge as electrical contacts. Transverse displacement of the free end tilts the plate on the edge, thus maintaining engagement therebetween. Longitudinal displacement separates the plate from the edge, thus breaking contact therebetween. The circuit is connected to the relay to vary the output in the sense of producing a signal equal for equal transverse and longitudinal displacements of the free end. In a modification, the plate and seat have four distinct contacts between them which are arranged at the four corners of a square. This arrangement is used to discriminate between the X and Y directions of the transverse displacement of the free end of the stylus.

8 Claims, 6 Drawing Figures

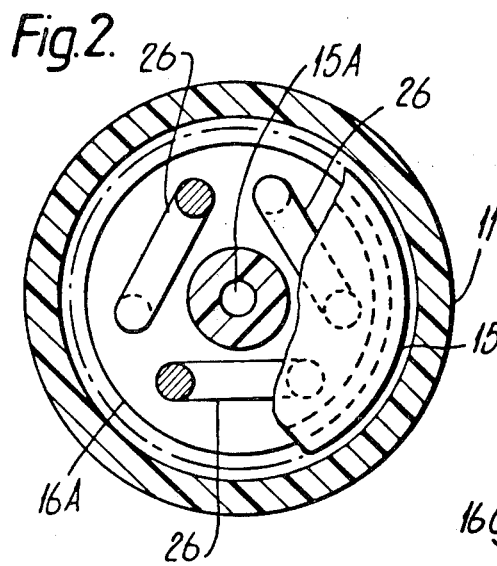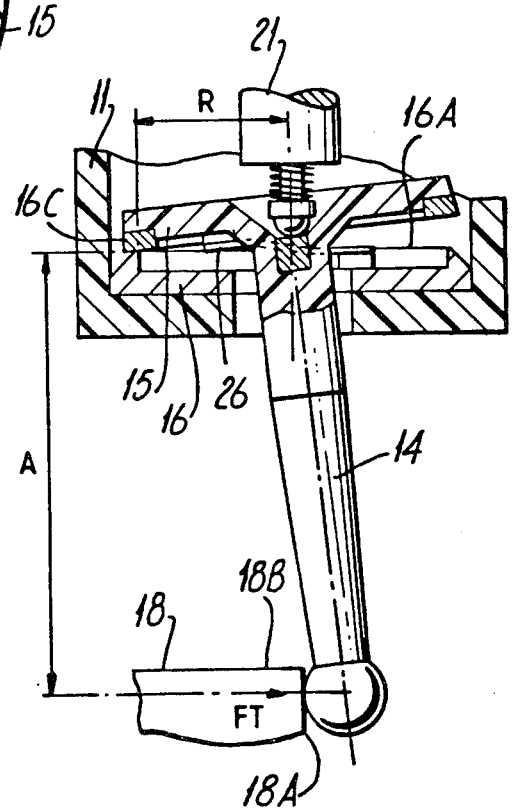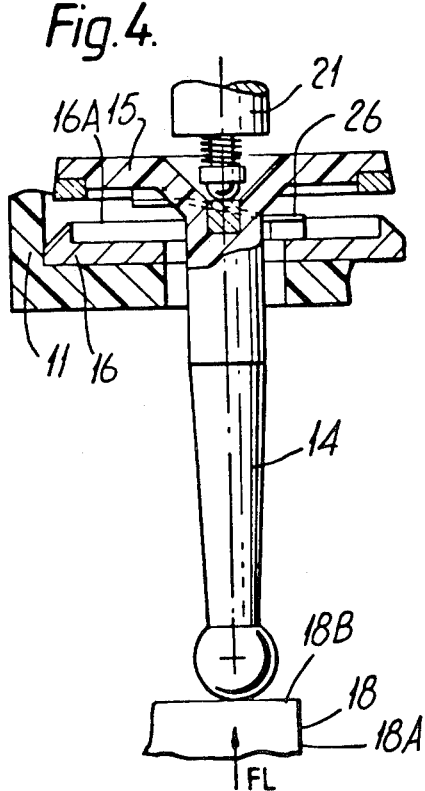

PROBE FOR MEASURING WORKPIECES

BACKGROUND OF THE INVENTION

This invention relates to a probe for measuring workpieces. A known such probe (U.K. Pat. No. 1,237,813) has an elongate stylus supported by a fixed member and a free end for engagement with the workpiece to be measured. The probe is intended to be mounted in a machine which can move the probe relative to the workpiece and which determines the instantaneous position of the probe in three dimensions relative to a datum position. To measure a given surface the machine moves the probe toward that surface and then halts the probe in a predetermined position, relative to the datum. Towards the end of the movement the free end of the stylus engages said surface and during the remainder of the movement the stylus becomes displaced by a small amount relative to the fixed member. This displacement is measured by a transducer connected between the stylus and the fixed member. If, when the probe is halted, the transducer output is zero, then the position of the surface is correct, i.e. conforms to the predetermined position. Any departure of the transducer output from zero indicates the extent of an incorrectness in the position of the surface.

To satisfy the requirement for three-dimensional operation, the stylus is supported on the fixed member for universal pivotal motion and for longitudinal motion. The pivotal motion occurs when the free end of the stylus is acted on in a direction transverse to the length of the stylus while the longitudinal motion occurs when said free end is acted on in the direction of the length of the stylus. Such an arrangement is advantageous from the point of view of mechanical construction.

Further, the known probe has a single transducer to indicate the extent of said displacement. This is desirable because inter alia it avoids the need to calibrate two or more transducers (which might be used for such probes) relative to one another. However, there is the difficulty that, due to the different geometries of the pivotal and the longitudinal motions, displacement of the free end of the stylus by a given distance results in different outputs of the transducer according to whether the motion of the stylus was pivotal or longitudinal. This makes it impossible to use a single calibration, i.e. a single zero setting, of the transducer for transverse and longitudinal displacement. The known probe copes with this difficulty by providing a cam and a slide between the stylus and the transducer but this is unsuitable for high accuracy applications because of the well-understood difficulty of friction and of play in such mechanical devices. It is an object of this invention to reduce or overcome this difficulty.

Further, in the known probe, the output of the single transducer does not discriminate between different axes of the orthogonal coordinate system. While this is not necessarily a difficulty if the surface to be measured is perpendicular to the direction in which the measurement is made, a difficulty arises if the measurement has to be taken at a point on a surface oblique to that direction. In such a case the stylus tends to slide along the oblique surface so that the displacement in the required direction of measurement is lost. It is a further, optional, object of this invention to overcome the latter difficulty also.

SUMMARY OF THE INVENTION

According to this invention there is provided a probe for measuring work pieces comprising a movable member including an elongate stylus and being supported on a fixed member for pivotal motion and for longitudinal motion of the stylus, a transducer for converting a mechanical input due to the respective said motions into an electrical signal, means responsive to the respective said motions for modifying the relationship between said mechanical input and said signal according to whether the motion is said pivotal or said longitudinal motion.

The modification of said relationship compensates for the differences which would otherwise occur in said mechanical input due to the differences in the geometrics of said pivotal and longitudinal motions, and as a result like signals are produced for like transverse or longitudinal displacements of the free end of the stylus.

A portion of the movable member may be supported on a portion of the fixed member at four locations situated at the four corners of a square, the movable member being pivotal on the fixed member about any adjacent two of said locations thereby to provide discrimination between transverse displacements of the free end of the stylus in different directions of the coordinate system.

BRIEF DESCRIPTION OF THE DRAWING

An example of a probe according to this invention will now be described with reference to the accompanying drawings wherein:

FIG. 2 is a section on the line II—II in FIG. 1
FIGS. 3 and 4 are part views based on FIG. 1

DESCRIPTION OF THE PREFERRED EMBODIMENTS

Figure 1:
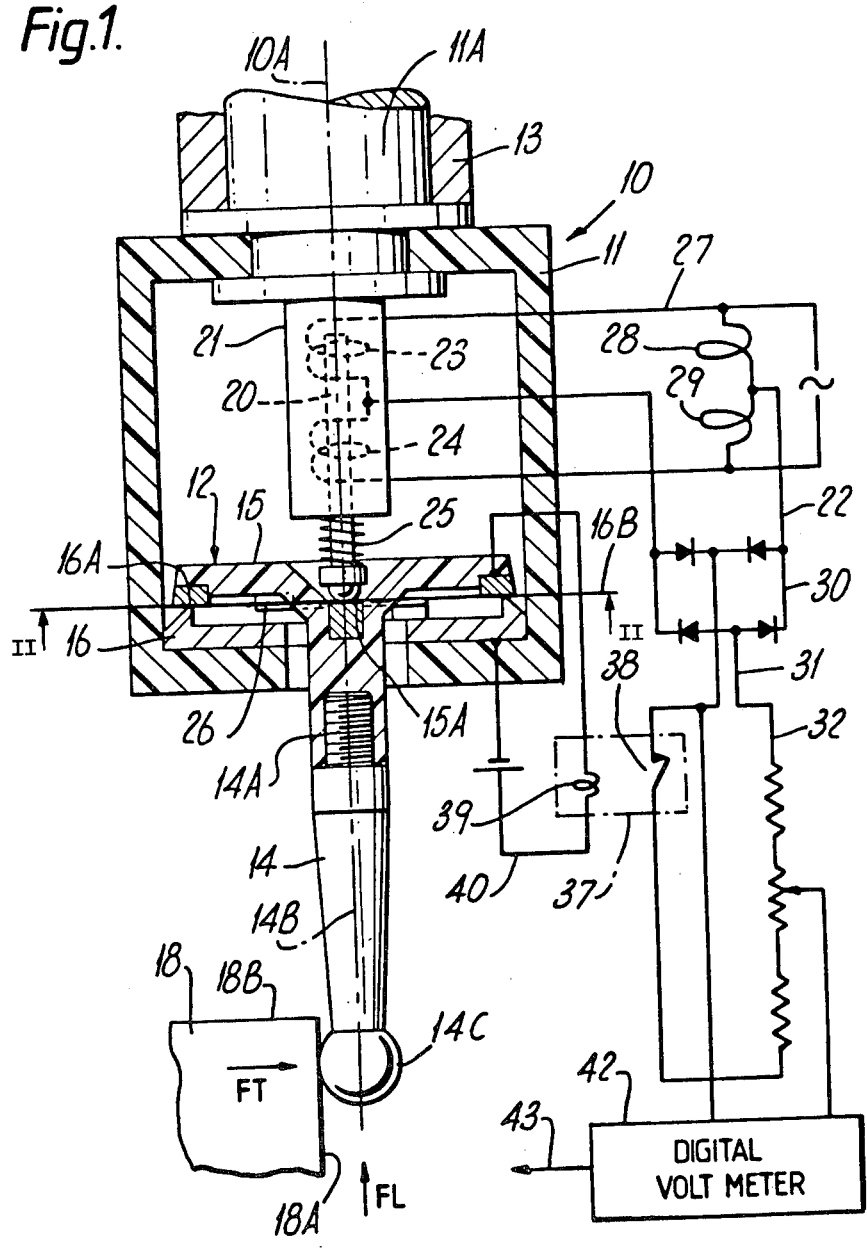
FIG. 1 is a sectional elevation of the probe.

Referring to FIGS. 1 and 2, the probe, generally denoted 10, has a fixed member or housing 11 including a spigot 11A for being secured to the head 13 of a coordinate measuring machine known per se. A movable member 12 includes an elongate stylus 14 secured at one end 14A thereof to a portion of the movable member being a plate 15 engageable with a portion of the fixed member being a seat 16 provided on the housing for the support of the stylus thereon. The seat is defined by a circular knife edge 16A lying in a plane 16B perpendicular to the length of the stylus as defined by an axis 14B. The end, denoted 14C, of the stylus remote from the plate 15 is free for engagement with a work piece 18 when, in operation, the head 13 is moved relative thereto. The stylus 14 has a rest position in which the plate 15 is in engagement with the circular edge 16A all-round the the circumference thereof, and the axis 14B of the stylus is aligned with a main axis 10A of the probe.

The stylus is urged axially into the rest position by a coil spring 25 urging a plunger 20 against the plate 15 at an abutment 15A. Leaf springs 26 connected between the plate 15 and the housing 11 locate the stylus 14 against displacement transversely to the axis 10A at least for so long as the stylus is in the rest position on the edge 16A.

In one operating mode (FIG. 3) the stylus is displaced from the rest position angularly in the sense of being tilted on the edge 16A by a force FT acting on the end 14C transversely to the length of the stylus, i.e. parallel to the plane 16B as by engagement with a laterally facing surface 18A of a work piece 18. In another operating mode (FIG. 4) the stylus is displaced from the rest position longitudinally, by a force FL in the direction of the axis 14B, as by engagement with an upwardly facing surface 18B of the work piece. In the latter mode the portions 15,16 separate. In either operating mode the displacement of the stylus causes axial displacement of the plunger 20 in opposition to the spring 25.

As will be described in detail later herein, the displacement of the end 14C in either mode is measured by measuring the corresponding axial displacement of the plunger 20. In this connection it is to be noted that like longitudinal and transverse displacements of the end 14C unavoidably produce different axial displacements of the plunger. More specifically, the longitudinal displacement of the end 14C (FIG. 4) results in an identical axial displacement of the plunger 20 but transverse displacement of the end 14C is determined by a ratio A/R where A is the distance between the end 14C and the point, e.g. 16C, on the edge 16A about which the stylus tilts and R is the radius of the edge 16A. The measuring system now to be described is adapted to compensate for this difference between the two modes of operation.

In the measuring system (FIG. 1) the displacement of the stylus is converted into an electrical analogue signal 22 by a transducer 21 comprising two induction coils 23,24 surrounding the plunger 20 and connected in a bridge circuit 27 to two further induction coils 28,29. The inductance of the coils 23,24 is variable in response to the movement of the plunger 20 with corresponding variation of the signal 22. The signal 22 is passed through a rectifier 30 whose output signal 31 is passed through a voltage divider 32 in which the signal 31 is modified according to whether the stylus was displaced transversely or longitudinally. The divider 32 is controlled by a contact 38 of a relay 37. The arrangement is such that the voltage of the signal 31 is raised when the contact 38 is closed, and vice versa.

The relay 37 has a coil 39 energisable by a circuit 40 connected across the plate 15 and seat 16, the latter two components being of conductive material. When the plate 15 is raised from the seat 16 (FIG. 4), the circuit 40 is broken and the contact 38 is opened to lower the voltage of the signal 31. The measuring system then has a calibration for measuring longitudinal displacement of the end 14C. However, when the end 14C is displaced transversely and the plate 15, though tilted, remains in contact with the edge 16A, the circuit 40 remains made, the contact 38 is closed and the signal 31 has the relatively higher level required to provide the calibration suitable for the relatively lesser displacement of the plunger 20 in this mode of operation. The voltage divider 32 is adjustable for fine adjustment of the two calibrations. The adjustment of the divider may be varied to suit different lengths of styli. The bridge circuit 27 is adjusted so that the signal 22 is zero when the plunger 20 is moved upwardly by a small distance, say 0.2 mm, so that a reading to either side of zero may be taken.

The signal 31 is passed to a digital volt meter 42 displaying the measurement in appropriate units and whose output 43 may be connected to a numerical control system for controlling the coordinate measuring machine in respect of which the probe is installed, such numerical control systems being known per se for measuring machines and for machine tools.

The movement of plunger 20 defines the mechanical input to the transducer 21. The signal 22 or any signal, e.g. 31 to 43, dependent thereon defines the electrical output of the transducer. The relationship between movement of the plunger and the output of the transducer defines the calibration of the transducer. The variation of the calibration may be effected by the voltage divider 32 as described or in the bridge circuit 27 or at any location fed by the signal 22.

Figure 5:
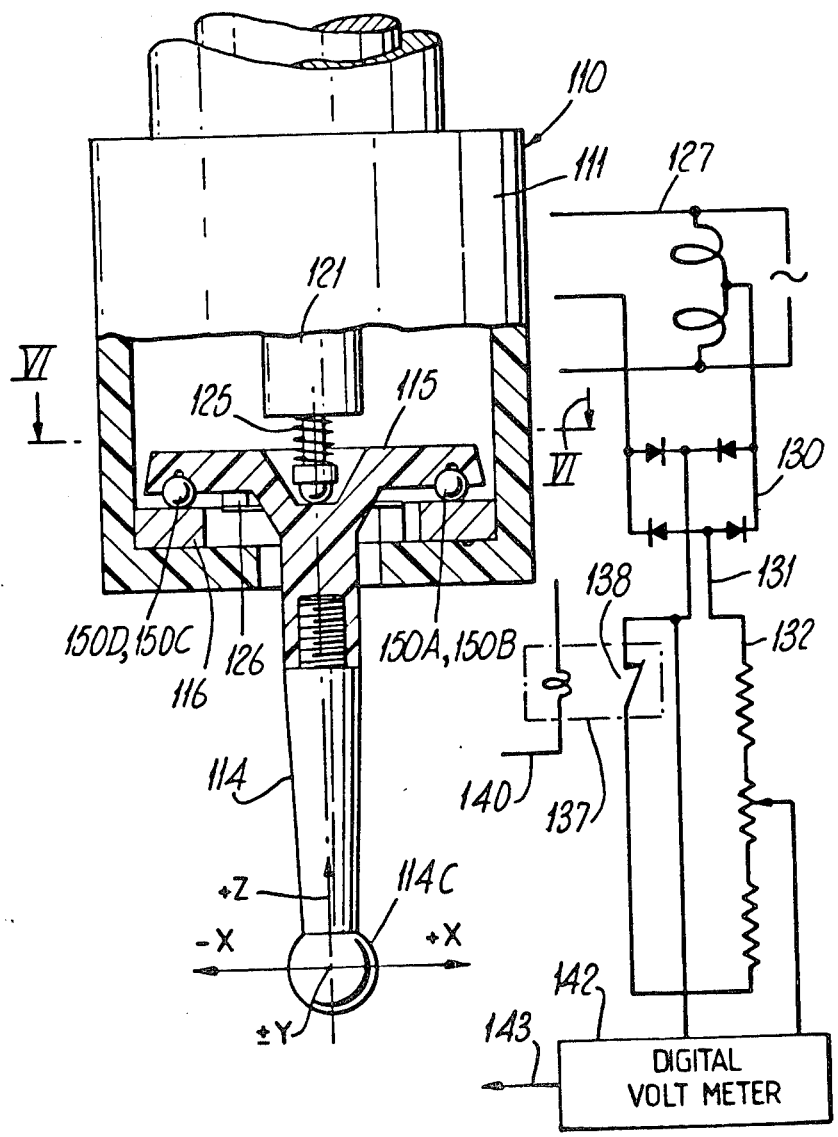
FIG. 5 is a view similar to FIG. 1 but shows a modification.
Figure 6:
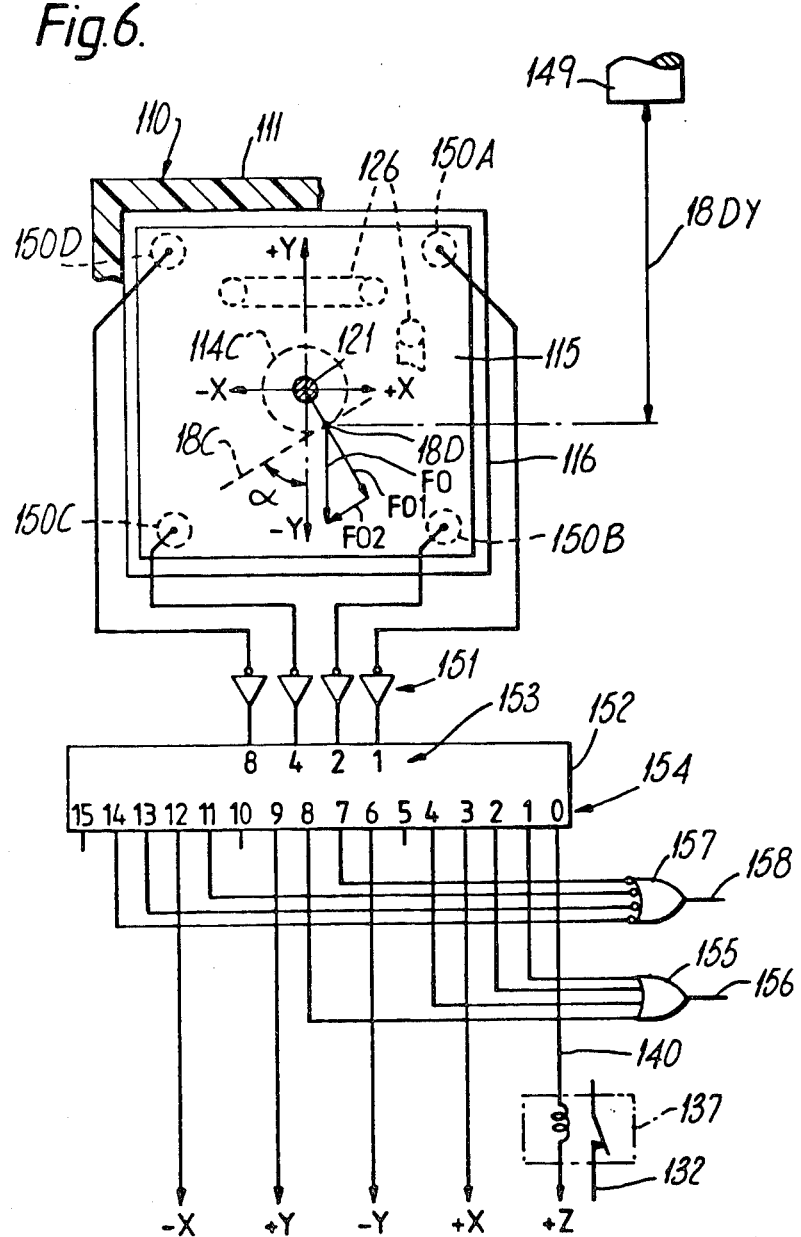
FIG. 6 is a view on the line VI—VI in FIG. 5.

In the modification (FIGS. 5,6) a probe generally denoted 110 has a fixed member or housing 111. A stylus 114 is secured to a plate 115 having separate contacts 150 (A,B,C,D) arranged at the respective corners of a square and being engaged under the action of a spring 125 with a common contact 116 provided on the housing 111. The stylus 114 is located against lateral displacement by springs 126. The housing contains a transducer 121 connected through a bridge circuit 127, rectifier 130, voltage divider 132, and digital voltmeter 142, to produce a signal 143. The arrangement as described so far is equivalent to that described in FIGS. 1 to 4 except for the four contacts 150. The sides of the square on which the contacts 150 are mounted are aligned with the X and Y directions of the coordinate system (FIG. 6). This arrangement makes it possible to stabilize the stylus in the X and Y directions i.e. against displacements oblique to the latter directions. The arrangement also makes it possible to identify the direction in which the measurement is taken.

Regarding stabilization, let it be assumed for example that the probe is moved in the −Y sense for the purpose of measuring a surface 18C, lying at an angle α to the Y direction. The end, denoted 114C, of the stylus will contact the surface 18C at a point 18D being the point whose distance 18DY from a datum surface 149 is to be measured. The engagement of the end 114C with the surface 18C produces on the stylus 114 a force FO causing the stylus 114 to tilt on the contacts 150 (B,C). The force FO has components FO1,FO2. The component FO2 tends to cause sliding of the end 114C along the surface 18D and consequent falsification of the measurement made by the transducer 121 and therefore of the distance 18DY. However, the fact that the stylus is supported on the two contacts 150(B,C), and is otherwise held by the springs 126, prevents that sliding so that the measurement stays true. This condition is satisfied so long as the angle α is sufficiently large for the component FO1 to pass between the contacts 150(B,C), i.e. so long as the force does not pass through only one of the contacts.

Regarding identification of direction, it will be clear that, when the stylus is tilted, the pattern in which the contacts 150(A,B,C,D) separate from the contact 116 provides a unique indication of the direction in which the measurement is taken. To this end, the contacts 150 are connected through respective inverters 151 to a binary-to-decimal encoder 152 (FIG. 6) known per se and having four input terminals 153(1,2,4,8) corresponding to the contacts 150(A,B,C,D) respectively. Further, the encoder 152 has 16 output terminals 154(0-15) representing decimal figures 0-15 respectively. The state of each terminal 153 and 154 is herein referred to as H or L depending on whether the terminal is at a high or a low voltage level. The terminals 153,154 are connected in accordance with the binary-to-decimal conversion and give the following results.

If the stylus 114 is displaced in the +X sense, the contacts 150(A,B) open and the terminals 153(1,2) become H. This raises the terminal 154(3) to H and provides the +X signal. If the stylus 114 is displaced in the −X sense, the contacts 150(C.D) open and the terminals 153(4,8) become H. This raises the terminal 154(12) to H and provides the −X signal.

Correspondingly, displacement of the stylus 114 in the −Y or +Y sense raises the outputs 154(6) or 154(9) respectively, to H to provide the −Y or +Y signals.

If the stylus is displaced in the +Z sense, all the inputs 153 become H and the output 154(0) becomes H to provide the +Z signal. The output 154(0) is used to change the state of a circuit 140 for the purpose of changing the setting of the voltage divider 132 and thus change the calibration of the transducer through a relay 137 in a manner equivalent to that described with reference to the relay 37 in FIGS. 1 to 4.

In order to ensure that all the contacts 150 engage the common contact 116 when the stylus 114 is as rest, the contacting surfaces are finished to an appropriate precision. However, inasmuch as it could occur that one of the four contacts 150 fails to engage the common contact 116 provision is made to produce a fault signal. To this end the outputs 154(1,2,4,8) are connected to an OR gate 155 whose output 156, normally at L, goes H if any one of the inputs 153 is H while the other three inputs are L.

It is also desirable to provide a fault signal if only one of the four contacts 150 is made while the other three break. This could occur if the angle α is unduly small. To produce this fault signal the outputs 154(7,11,13,14) are connected to a NOR gate 157 whose output 158 goes L if any three of the four inputs 153 are H while the remaining input is L.

The springs 126 may be arranged in a square formation parallel to the sides of the square formed by the contacts 150 to assist in the stability of the plate 115 during displacement in the X or Y direction.

I claim:

1. A probe for measuring workpieces comprising
a fixed member having an axis;
a movable member including an elongate stylus supported on said fixed member and having a free end, said stylus being displaceable relative to the fixed member in the direction of said axis by a corresponding axial displacement of said free end and angularly displacable relative to said axis by a displacement of said free end in a direction transverse to said axis;
a transducer connected between said movable member and said fixed member, said transducer producing an initial output corresponding to a displacement of said free end, the initial output responsive to a given axial displacement of said free end differing from the corresponding initial output responsive to an equal transverse displacement of said free end;
means for generating a signal responsive to one of the axial and angular displacements of said stylus; and
means responsive to said signal for modifying the output of said transducer to produce a final output which is equal for equal axial and transverse displacements of said free end.

2. A probe according to claim 1 wherein said movable member includes a portion extending in a plane transverse to said axis and which is seated on a confronting portion of said fixed member, said portions being relatively tiltable for angular displacement of said stylus and separable for axial displacement of said stylus.

3. A probe according to claim 2 wherein one of said portions has a circular edge supported on a flat surface of the other one of said portions, and said movable member is pivotal on said fixed member about any point on said edge.

4. A probe according to claim 2 wherein said portion of the movable member is supported on said portion of the fixed member at four locations situated at the four corners of a square, and said movable member is pivotal on said fixed member about any adjacent two of said locations.

5. A probe according to claim 2 wherein said means for generating a signal responsive to one of the axial and angular displacements of said stylus comprises a pair of electric contacts defined by said portions of the fixed and movable members, and means defining an electric circuit connected across said contacts so as to change state according to whether engagement at said contacts is retained during angular displacement of said stylus or broken following axial displacement of said stylus.

6. A probe according to claim 3 wherein said means for generating a signal responsive to one of the axial and angular displacements of said stylus comprises a pair of electric contacts defined by said portions of the fixed and movable members, and means defining an electric circuit connected across said contacts so as to change state according to whether engagement at said contacts is retained during angular displacement of said stylus or broken following axial displacement of said stylus.

7. A probe according to claim 4 wherein said means for generating a signal responsive to one of the axial and angular displacements of said stylus comprises a pair of electric contacts defined by said portions of the fixed and movable members, and means defining an electric circuit connected across said contacts so as to change state according to whether engagement at said contacts is retained during angular displacement of said stylus or broken following axial displacement of said stylus.

8. A probe according to claim 4 wherein said means for generating a signal responsive to one of the axial and angular displacements of said stylus comprises a pair of electric contacts defined by said portions of the fixed and movable members at each of said four locations, electric circuit means connected to said contacts at said respective locations, and means responsive to engagement being broken at any two of said locations for outputting signals identifying the four senses in which said movable member is pivotal.

* * * * *